Oct. 11, 1932.　　　R. H. HUTCHINSON　　　1,882,616
SOCKET JOINT
Filed Dec. 15, 1930　　2 Sheets-Sheet 1

Inventor,
R. H. Hutchinson.
Per,
Blair & Kilcoyne Attys

Oct. 11, 1932.   R. H. HUTCHINSON   1,882,616
SOCKET JOINT
Filed Dec. 15, 1930    2 Sheets-Sheet 2
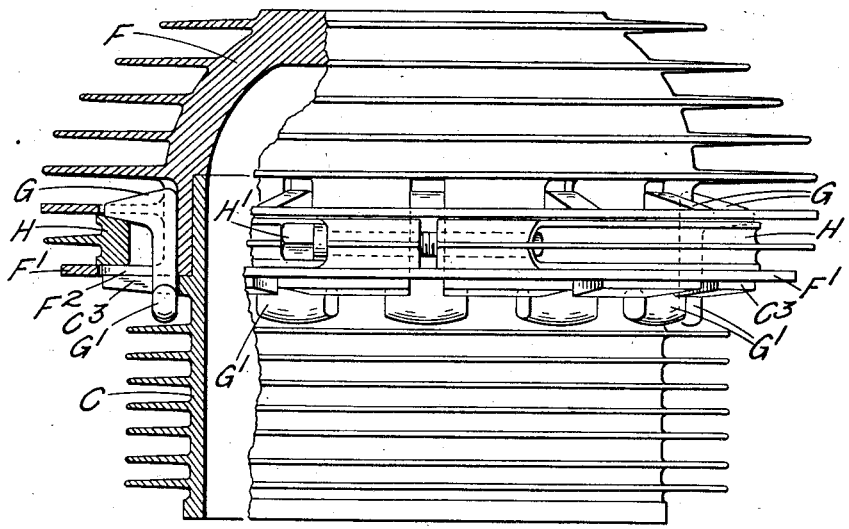
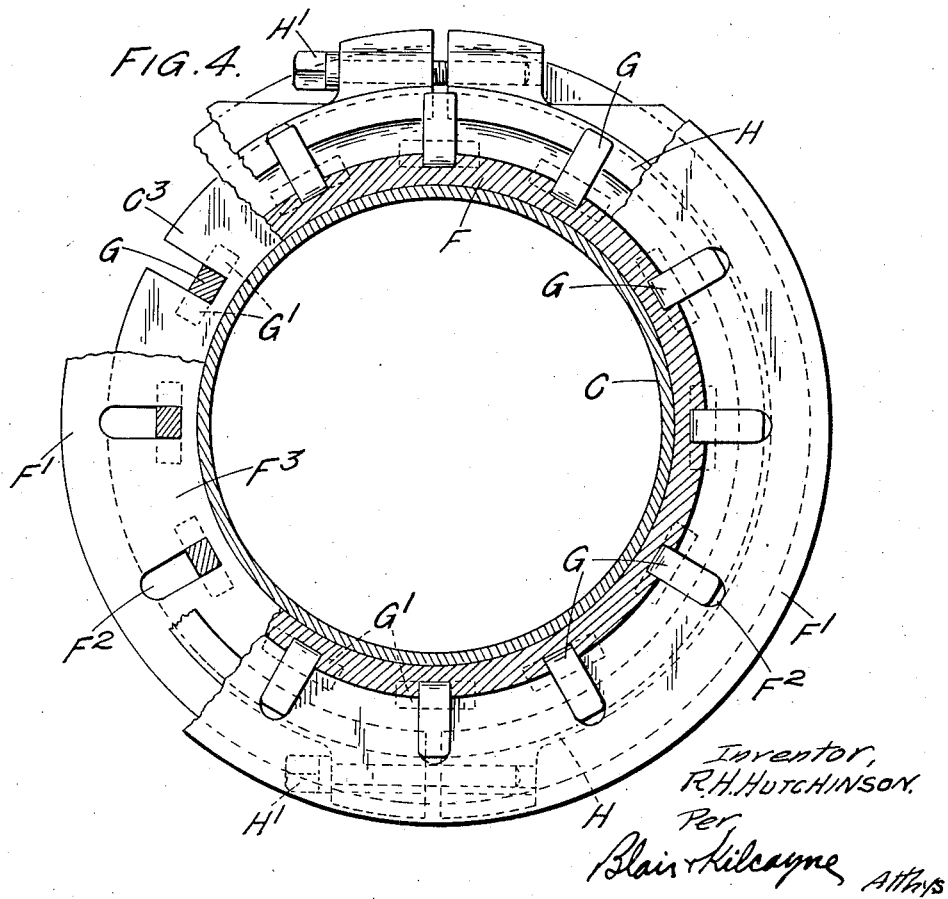

Patented Oct. 11, 1932

1,882,616

UNITED STATES PATENT OFFICE

ROBERT HALLER HUTCHINSON, OF LONDON, ENGLAND, ASSIGNOR TO D. NAPIER & SON LIMITED, OF LONDON, ENGLAND, A COMPANY OF GREAT BRITAIN

SOCKET JOINT

Application filed December 15, 1930, Serial No. 502,511, and in Great Britain March 4, 1930.

This invention relates to joints or means for securing a member within a socket and for securely locking these two parts together in a way which enables them to be separated when desired. The object of the invention is to provide an improved form of joint particularly, but not exclusively, suited to cylindrical or tubular articles.

According to this invention one of the cooperating portions of the joint is provided with a series of circumferentially spaced castellations or detachable fingers which form castellations when in place and serve as tension members, and the other cooperating portion has a series of projecting portions which may comprise integral or separate lugs, the ends of the lugs and/or of the fingers between which they fit being provided with inclined inner surfaces so that the two parts are locked together when a wedge-shaped ring or strap is clamped into position so as to force the oppositely inclined lugs and fingers apart.

The invention is particularly suited for attaching the cylinder head of an internal combustion engine to its cylinder or for attaching individual cylinders of a multi-cylinder engine to their respective sockets in a common plate or crank case and can be used with advantage in cases where the cylinders are so closely spaced that relative rotation between the individual cylinders is impossible without fouling some projection on the adjacent cylinder or cylinder head. Thus the invention can be used even when the employment of a screwthread joint for connecting the above parts is impossible.

The castellations need not be formed integral with the socket member but may, for example, be carried by a separate sleeve or its equivalent which may be externally screwthreaded so as to screw into the socket or have a projecting flange or shoulder to engage a corresponding groove or projection on the socket proper.

Figure 1:
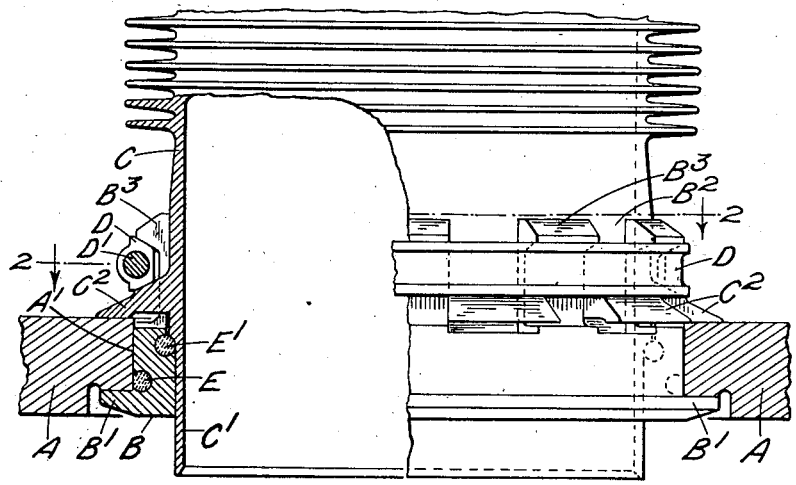
Figure 2:
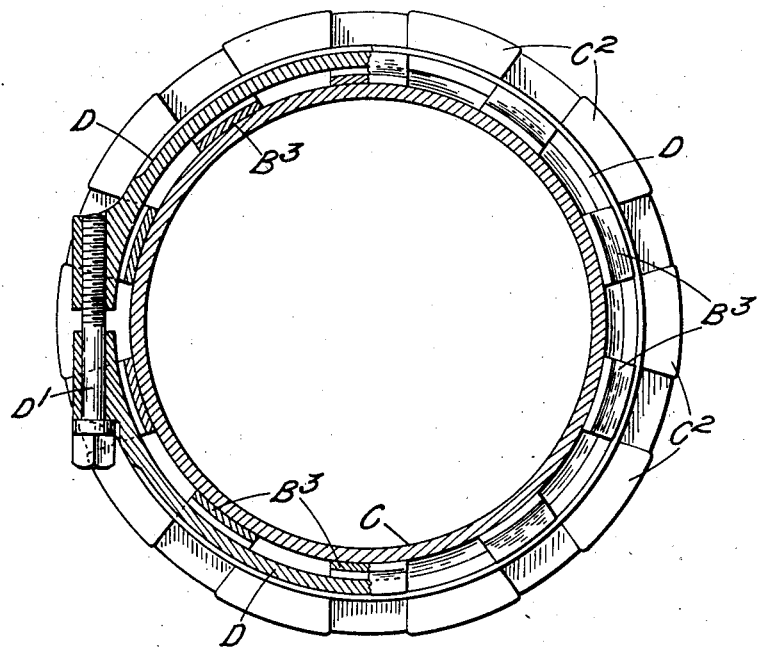

Two constructions of socket joint according to this invention are illustrated by way of example in the accompanying drawings, in which Figure 1 illustrates in side elevation and partly in section a joint as applied to connect a cylinder of an internal combustion engine to its crank case, Figure 2 is a plan on the line 2—2 of Figure 2, Figure 3 illustrates a modified form of joint as used to connect the cylinder head to the cylinder, and Figure 4 is a sectional plan with parts broken away.

It is assumed that the cylinder illustrated in each case is one of several of a multi-cylinder engine and that the individual cylinders are so closely spaced that they or their heads cannot be completely rotated without fouling some projecting part of the next adjacent cylinder or cylinder head. In such cases it is not possible to employ a screwthreaded joint or a screwthreaded liner to connect the parts together.

In the construction illustrated in Figures 1 and 2 the opening $A^1$ in the plate or crank case A is provided with a sleeve or liner B having at its inner end a projecting flange $B^1$ to engage a shoulder on the interior of the crank case A. The outer end of the sleeve B extends above the crank case A and is castellated, i. e. furnished with alternate slots $B^2$ and projections $B^3$. The cylinder C is provided with a tubular extension $C^1$ adapted to slide within the castellated sleeve B and carries on its outer wall a series of projecting portions in the form of lugs $C^2$ adapted to fit into the slots $B^2$. The lower or outer surface of the lugs $C^2$ is shaped to bear upon the crank case A and the upper or inner surface of the lugs $C^2$ as also the lower or inner surface of the projections $B^3$ are inclined (as clearly shown in Figure 1) so as to form a seating for a clamping ring D.

The ring D is wedge-shaped in cross-section and is furnished with a tensioning bolt $D^1$ so that when the ring D has been placed in position, as shown in Figure 1, and the bolt $D^1$ tightened the lugs $C^2$ and projections $B^3$ are forced apart, the projections $B^3$ thus serving as tension members for transmitting the stresses to the sleeve B. The sleeve B is suitably grooved to receive packing elements E, $E^1$ whereby a tight joint is ensured respectively between the sleeve and the crank case and between the extension C¹ and the sleeve.

In this way the cylinder C is pressed against the crank case A and the flange B¹ is drawn into close engagement with the shoulder inside the crank case. Thus the cylinder can be locked to the crank case and constantly pressed into engagement therewith by tightening the bolt D¹, and it will be seen that the engagement between these two parts is secured without any relative movement between the cylinder and the crank case.

If desired one or more bolts or studs may be provided, preferably capable of being adjusted from outside the crank case and adapted to engage the inner flange or shoulder of the castellated sleeve and prevent this sleeve from falling into the bottom of the crank case before it is locked to the cylinder. Each bolt or stud preferably passes through a slot in the crank case, segmental in shape and of sufficient length to permit the castellated sleeve to be turned slightly within the opening in the crank case thereby bringing the castellations into correct alignment with the corresponding projections on the cylinder. The castellated sleeve or its equivalent, instead of having a flange for engagement with the interior of the crank case, may be externally screwthreaded so as to screw into the corresponding opening in the crank case.

In the construction illustrated in Figures 3 and 4, a cylinder head F is secured at its cylindrical portion to its cylinder C by a socket joint generally similar to that above described but in this case fingers G corresponding to the castellations B³ in Figures 1 and 2 are separately formed and are provided at their lower ends with T-shaped heads G¹ adapted to engage an annular groove on the under side of a flange C³ formed on the cylinder C. The cylinder head F has an annular projecting flange F¹ furnished with radial slots F² so as to leave a series of intervening portions F³ corresponding to the lugs C² in Figure 1. The fingers G pass freely through the slots F² so that when a clamping ring H is applied and tightened by turning clamping bolts H¹, and fingers G and the intervening projecting portions F³ are forced apart whereby the cylinder C and the cylinder head F are drawn tightly together. In this construction the separate fingers G act as tension members for transmitting the stresses to the cylinder C.

It will be understood that the clamping ring may be formed in any desired number of sections so as to facilitate attachment, and if desired instead of inclined surfaces being provided both on the castellations or fingers and on the lugs or projections which fit between them, only one of these two cooperating parts may be so constructed.

Although the invention has been described with particular reference to a cylindrical socket for a hollow cylinder, it will be understood that the invention is not limited to such uses and that without appreciable modification the invention can be applied to pipe unions and to sockets which are not circular in plan. Further, although particularly suited for joining two tubular hollow bodies together, it will be understood that the member which fits into the socket can be in the form of a solid lid or plug without departing from this invention.

What I claim as my invention and desire to secure by Letters Patent is:

1. A joint for securing a cylinder to a plate including in combination a series of circumferentially spaced radially projecting parts on the cylinder, a series of similarly spaced axially extending tension bars passing through said projecting parts, a part formed integral with the lower end of each tension bar and engaging the lower face of the plate, radial projections on the upper ends of said tension bars, the opposed inner surfaces respectively of the radially projecting parts on the cylinder and the radial projections on the tension bars being relatively inclined, and an annular strap wedge-shaped in cross section engaging the said opposed surfaces to force them axially apart and thus hold the cylinder to the plate.

2. A joint for securing a cylinder to a plate including in combination a skirt portion on the lower end of the cylinder which lies within an aperture in the plate, a series of circumferentially spaced radial projections on the cylinder, a series of similarly spaced axially extending tension bars adapted to fit between said projections, a ring formed integral with the tension bars lying between the skirt portion of the cylinder and the margin of the aperture in the plate and engaging the lower face of the plate, radial projections on the upper ends of said tension bars, the opposed inner surfaces respectively of the radial projections on the cylinder and on the tension bars being relatively inclined, and an annular strap wedge-shaped in cross section engaging the said opposed surfaces to force them axially apart and thus hold the cylinder to the plate.

3. A joint for securing a cylinder to a second cylinder coaxially therewith including in combination a flange-like plate adjacent to the end of one cylinder and having a series of circumferentially spaced apertures therein, a complementary flange adjacent to the end of the second cylinder and having a complementary series of circumferentially spaced apertures each opposite one of the apertures in the plate on the first-mentioned cylinder, an axially extending tension bar passing through each pair of complementary apertures, a laterally extending projection on one end of said tension bar engaging the surface of the plate on the first-mentioned cylinder remote from the joint, a radial projection on the other end of said tension bar, the opposed inner surfaces of said radial projection and the flange on the second-mentioned cylinder being relatively inclined, and an annular strap wedge-shaped in cross section engaging the said opposed surfaces to force them axially apart and thus hold the flange on the second-mentioned cylinder to the plate on the first-mentioned cylinder.

In testimony whereof I have signed my name to this specification.

ROBERT HALLER HUTCHINSON.